United States Patent
Cronk et al.

(10) Patent No.: US 6,532,538 B1
(45) Date of Patent: Mar. 11, 2003

(54) METHOD AND SYSTEM FOR SUPPORTING MULTIPLE OPERATING SYSTEMS ON THE SAME DISK RUNNING ON DIFFERENT COMPUTERS AT THE SAME TIME

(75) Inventors: Matthew Slade Cronk, Austin, TX (US); Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,232

(22) Filed: Feb. 17, 2000

(51) Int. Cl.[7] .............................................. G06F 9/445
(52) U.S. Cl. ......................................... 713/2; 709/222
(58) Field of Search ........................ 713/1, 2; 709/220, 709/222

(56) References Cited

U.S. PATENT DOCUMENTS

| | | | |
|---|---|---|---|
| 4,747,040 A | | 5/1988 | Blanset et al. .............. 364/200 |
| 5,278,973 A | | 1/1994 | O'Brien et al. ............. 395/500 |
| 5,828,888 A | * | 10/1998 | Kozaki et al. .............. 717/170 |
| 5,870,554 A | * | 2/1999 | Grossman et al. ............. 713/2 |
| 5,960,175 A | * | 9/1999 | Grossman et al. .......... 709/222 |
| 6,178,503 B1 | * | 1/2001 | Madden et al. ................ 713/2 |
| 6,330,669 B1 | * | 12/2001 | McKeeth ....................... 713/1 |

FOREIGN PATENT DOCUMENTS

GB 2293675 4/1996 ............. G06F/9/46

* cited by examiner

Primary Examiner—Thomas M. Heckler (57) ABSTRACT

A method and system for running, on different computers at the same time, multiple operating systems from the same shared system resource is provided. This is accomplished, for example, by using persistent elemental disk reservations. Each machine reads the master boot record without reservation to determine the partition of the operating system to be booted. Each machine then makes an elemental exclusive write persistent reservation for accessing the operating system boot partition. This is followed by each machine making another elemental exclusive write persistent reservation for accessing the operating system partition itself. Each machine is assigned a different operating system partition even if they are running the same operating system. The unique reservation key for these reservations is created from at least on of a Processor ID, a Cluster ID, a Multiple Processor partition ID, a Non-Uniform Memory Access complex ID, and/or a Non-Uniform Memory Access node ID.

16 Claims, 3 Drawing Sheets

METHOD AND SYSTEM FOR SUPPORTING MULTIPLE OPERATING SYSTEMS ON THE SAME DISK RUNNING ON DIFFERENT COMPUTERS AT THE SAME TIME

BACKGROUND OF THE INVENTION

1. Technical Field

The present invention relates generally to an improved data processing system and in particular to a method and an apparatus for supporting multiple operating systems. Still more particularly, the present invention provides a method to allow multiple operating systems resident on the same physical disk to run on different computers at the same time.

2. Description of Related Art

Loading and running an operating system (OS) is accomplished by using a bootstrap program. Normally, starting the operating system is a two step process involving a "simple" boot program that determines which operating system to load and a more complex boot program that actually loads the selected operating system. The simple boot program, usually stored in nonvolatile system RAM (NVRAM), is used to perform system resource initialization. Specifically, the simple boot program initializes registers in the Central Processing Unit (CPU) and initializes device controllers, such as controllers for the system disk and memory. The simple boot program can read and write to memory and can load from a boot block on the system disk. The boot block contains the master boot record (MBR) and is located at sector 0 of the system disk drive.

The master boot record (MBR) is loaded from the system disk and contains a partition table and some executable code. The master boot executable code scans the partition table for a single active partition, loads the first sector from the active partition into memory, and executes this code, which is the boot code for the selected operating system. This operating system boot code loads the operating system that is being booted and starts the operating system in a defined manner.

If a hard disk contains, for example, an MS-DOS partition, a LINUX partition, a Windows NT partition, and an IBM OS/2 partition, a user can change which of these systems will be started by changing the active partition. The active partition may be set by storing this information in nonvolatile system RAM (NVRAM). Normally the last operating system installed on the system disk drive updates the NVRAM so that this operating system will be booted. But an operating system can provide a utility program that allows a different operating system to be designated as the active partition in NVRAM. This then allows the next reboot to boot to a different operating system.

Although the above method allow the user to select an operating system to be booted at system startup, this method does not allow two or more operating systems on different machines to run at the same time from the same system disk. Thus, any machine making use of a shared system disk having, for example, an OS/2 partition as the active partition must itself run under the OS/2 operating system. This limits the versatility of the system and places restrictions on the system resources, such as the type of file system, that can be accessed. Therefore, it would be advantageous to have a method and a system for accessing a shared system resource, such as a system disk drive, so that different machines may run different operating systems and access appropriate system resources at the same time.

SUMMARY OF THE INVENTION

The present invention provides a method and system for running, on different computers at the same time, multiple operating systems from the same shared system resource. This is accomplished, for example, by using persistent elemental disk reservations. Each machine reads the master boot record without reservation to determine the partition of the operating system to be booted. Each machine then makes an elemental exclusive write persistent reservation for accessing the operating system boot partition. This is followed by each machine making another elemental exclusive write persistent reservation for accessing the operating system partition itself. Each machine is assigned a different operating system partition even if they are running the same operating system. The unique reservation key for these reservations is created from at least on of a Processor ID, a Cluster ID, a Multiple Processor partition ID, a Non-Uniform Memory Access complex ID, and/or a Non-Uniform Memory Access node ID.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein like numerals designate like elements, and wherein:

DETAILED DESCRIPTION OF THE PREFERRED EMBODIMENT

In a typical computer system the system disk drive is divided into physical sectors of a fixed size and number determined at the time the disk is manufactured. A partition on a disk drive is a logical sequence of sectors that are contiguous to each other. In order for multiple operating systems to reside on the same disk drive, each copy of the operating system is assigned its own partition on the disk. This reservation may be exclusive, meaning that only the computer with a particular, unique key can access the assigned partition. The partition reservation may also be persistent, i.e. it is protected across initiator failures, such as a hard reset of the system. Persistent reservations are retained by the disk drive until they are released.

Persistent reservations may also be elemental, meaning they can reserve a group of contiguous sectors of a hard disk. If the data in the reserved portion of the disk is going to be changed, then the elemental persistent reservation is a write reservation. Granting to a computer the elemental exclusive write persistent reservation on a portion of a disk means that only that computer with its unique reservation key can access that portion of the disk drive. For a single processor machine, this key might be the Processor ID. For a multiple processor machine, such as a non-uniform memory access (NUMA) machine, this key might contain the Cluster ID, the Multiple Processor partition ID, the NUMA complex ID, or the NUMA node ID. This key will be referred to simply as the reservation key.

Figure 1:
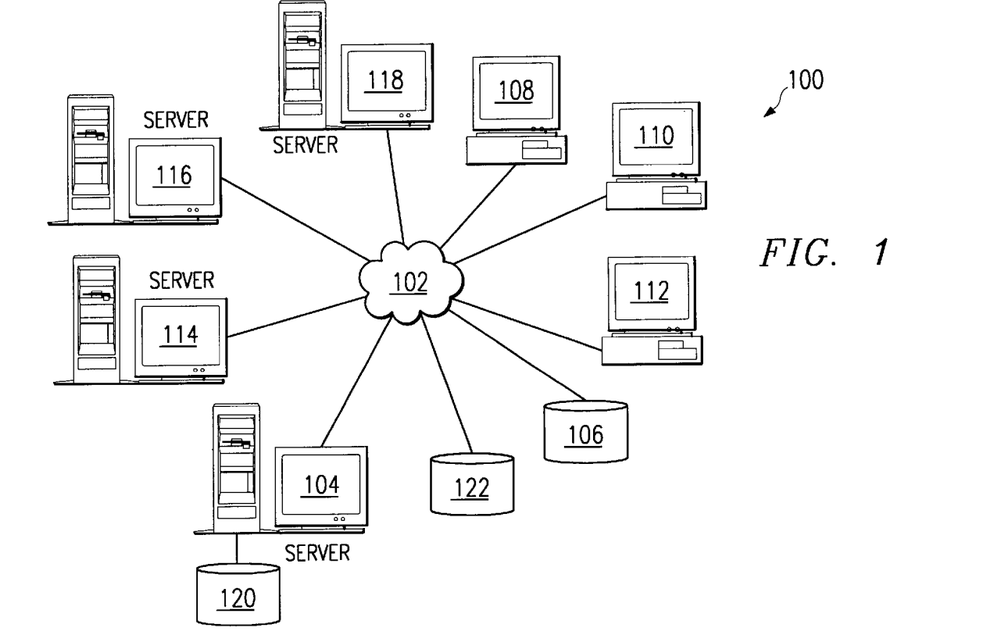
FIG. 1 is an exemplary diagram illustrating a networked data processing environment in which the present invention may be implemented.

With reference now to the figures, FIG. 1 is an exemplary diagram illustrating a data processing system in which the present invention may be implemented. Distributed data processing system 100 may be, for example, a network of computers, such as a local area network (LAN), a wide area network (WAN), the Internet, an Intranet, and the like. The distributed data processing system 100 contains at least one network 102, which is the medium used to provide communications links between various devices and computers connected together within distributed data processing system 100. The network 102 may include permanent connections, such as wire or fiber optic cables, or temporary connections made through telephone connections.

In the depicted example, server 104 is connected to network 102 along with storage unit 106. In addition, clients 108, 110, and 112 also are connected to a network 102, as well as additional servers 114, 116, and 118. These clients 108, 110, and 112 may be, for example, personal computers or network computers. For purposes of this application, a network computer is considered to be any computer coupled to a network which receives a program or other application from another computer coupled to the network. In the depicted example, server 104 may provide data and applications to clients 108–112. Clients 108, 110, and 112 are clients to server 104. Distributed data processing system 100 may include additional servers, clients, shared disk drives, such as disks 106 and 122, and other devices not shown.

In the depicted example, distributed data processing system 100 is an Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. of course, distributed data processing system 100 also may be implemented as a number of different types of networks, such as for example, an intranet, a local area network (LAN), or a wide area network (WAN). For example, on a LAN, disk drive 106 may be shared between clients 108, 110, 112, and each of these clients may have booted a different operating system resident on disk 106.

FIG. 1 is intended as an example, and not as an architectural limitation for the present invention. For example, with respect to the present invention, the "computers" may be processors in a single machine with multiple processors provided each processor has it own memory partition. In this case, multiple operating systems could be run simultaneously on the "same machine" provided each operating system is assigned its own processor and its own memory partition.

Figure 2:
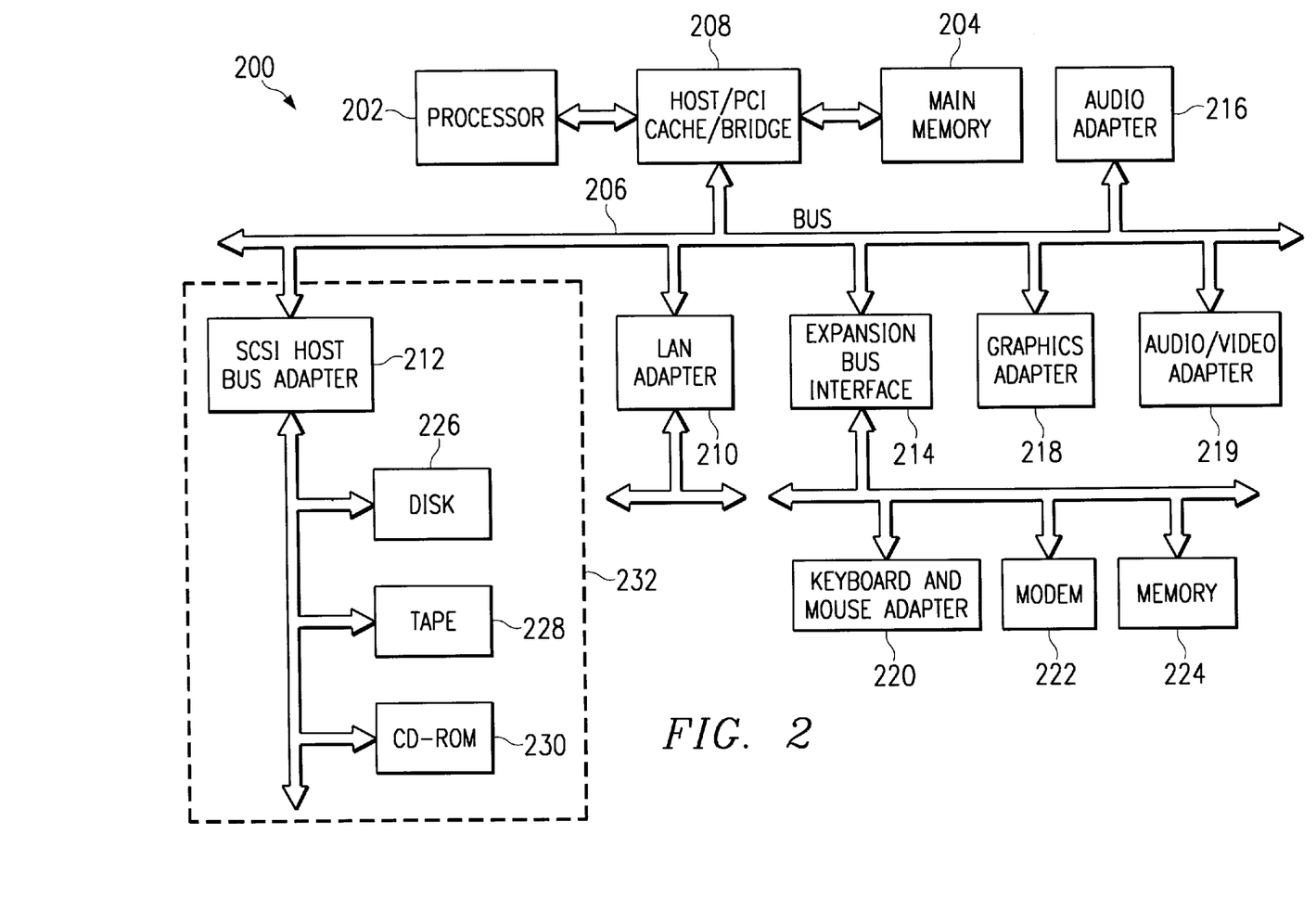
FIG. 2 is an exemplary block diagram illustrating a data processing system in which the present invention may be implemented.

With reference now to FIG. 2, an exemplary block diagram illustrates a data processing system in which the present invention may be implemented. Data processing system 200 is an example of a computer, such as computer 108 in FIG. 1, in which code or instructions implementing the processes of the present invention may be located. Data processing system 200 employs a peripheral component interconnect (PCI) local bus architecture. Although the depicted example employs a PCI bus, other bus architectures such as Micro Channel and Industry Standard Architecture (ISA) may be used. Processor 202 and main memory 204 are connected to PCI local bus 206 through PCI bridge 208. PCI bridge 208 also may include an integrated memory controller and cache memory for processor 202.

Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation, Windows NT, which is available from Microsoft Corporation, or the like. Instructions for the operating system, applications or programs are located on storage devices, such as hard disk drive 226, and may be loaded into main memory 204 for execution by processor 202. It is also possible, as detailed in the present invention, that the operating system is resident on a shared disk drive on a network, such as disk 106 in FIG. 1, and that the computer system depicted in FIG. 2 loads the operating system from this shared disk drive.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, data processing system 200 may include a network communication interface, such as LAN adapter 210, modem 222, or the like. As another example, data processing system 200 may be a stand-alone system configured to be bootable without relying on a network communication interface, whether or not data processing system 200 comprises a network communication interface. The depicted example in FIG. 2 and above-described examples are not meant to imply architectural limitations. For example, the present invention may be implemented in multiple processor systems, such as a non-uniform memory access (NUMA) computer.

Figure 3:
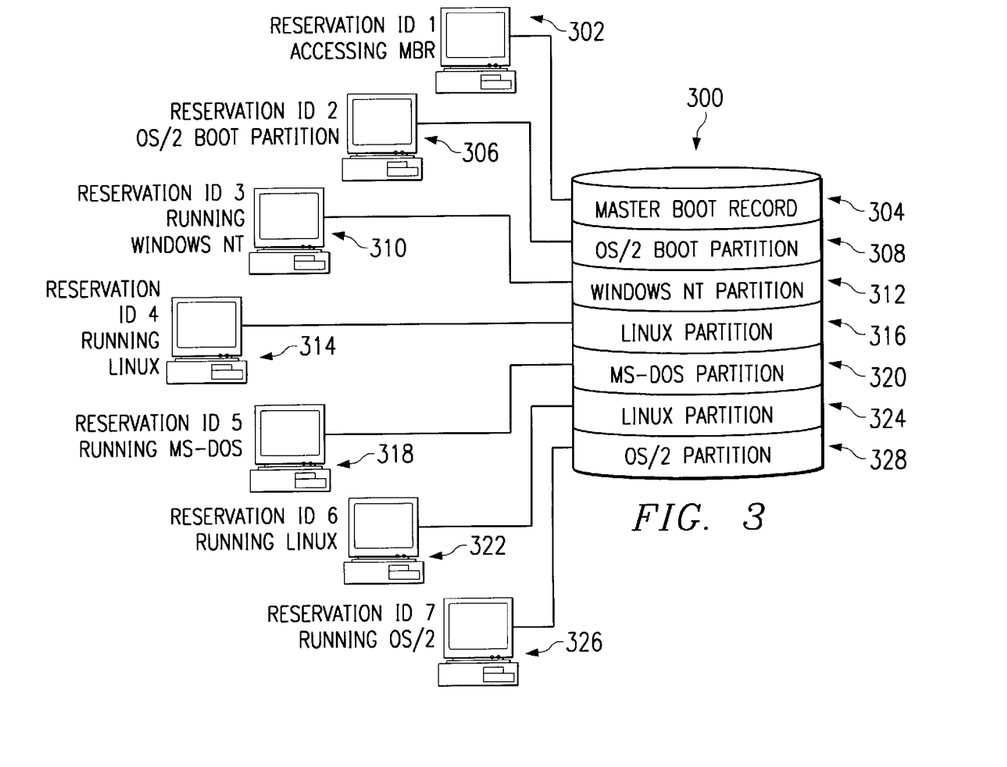
FIG. 3 is an exemplary diagram illustrating multiple operating systems running on the same system resource at the same time in accordance with one embodiment of the present invention.

With reference now to FIG. 3, an exemplary diagram illustrates multiple operating systems running on different machines at the same time from the same disk in accordance with a preferred embodiment of the invention. In the depicted example, the system resource that is accessed by the plurality of devices is hard disk drive 300, however, the invention is not limited to such an embodiment. Any system resource that is capable of being partitioned using elemental exclusive persistent reservations may be used without departing from the spirit and scope of the invention. For example, the system resource may be a ZIP disk drive, a JAZ disk drive, a re-writable CD disk, and the like. Also the computer systems shown may be individual processors in a multiple processor system, such as a Non-Uniform Memory Access computer.

Disk drive 300 is accessed by a plurality of machines, which, for simplicity, are shown with reservation IDs 1 through 7. Each computer running an operating system on disk 300 is assigned a separate partition for its operating system and uses its reservation ID as a key to reserve this partition. In the depicted example, computer 302 is currently accessing master boot record 304 at the start of the boot process. Computer 306 has already read the master boot record and determined it is to boot the OS/2 operating system. It is now executing OS/2 boot partition 308. Computer 310 is currently running the Windows NT operating system, a product of Microsoft Corporation. Its reservation ID (# 3) is used as a key to reserve an elemental persistent reservation for Windows NT partition 312 on disk 300. Computer 314 is running Linux and has reserved Linux partition 316 on disk 300 using its reservation ID (# 4) as a key. Computer 318 is running MS-DOS and has reserved MS-DOS partition 320 on disk 300 using its reservation ID (# 5) as a key. Computer 322 is running Linux, but notice that its Linux partition 324 on disk 300 is different than Linux partition 316 reserved by computer 308. Computer 326 is running OS/2 and has reserved OS/2 partition 328 on disk 300 using its reservation ID (# 7) as a key. Thus, by using different reservation IDs and different partitions on a shared disk drive, different computers can simultaneously run different operating systems from the shared disk drive.

In FIG. 3 reservation IDs are shown as simple integers. As one of ordinary skill in the art will appreciate, actual values may be more complex. In addition, the illustration of partitions on disk drive 300 in FIG. 3 does not represent actual relative amounts of physical disk space. For example, the master boot record may take only one sector of the disk while an operating system partition may take tens of thousands of sectors.

Figure 4:
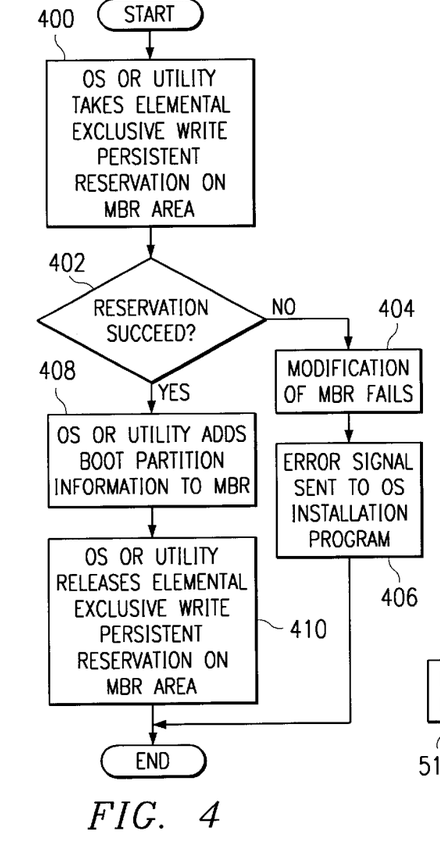
FIG. 4 is a flowchart outlining an exemplary operation for updating a master boot record when a new operating system is added to the system in accordance with one embodiment of the present invention.

With reference now to FIG. 4, a flowchart outlines an exemplary operation for updating a master boot record when a new operating system is added to the system in accordance with one embodiment of the present invention. For example, the partition table in the master boot record must be changed each time an operating system partition, such as partitions 312, 316, 320, 324, and 328 in FIG. 3, is added to disk drive 300. When an operating system is installed, a partition on the system resource, such as disk drive 300, is reserved and the partition information is added to master boot record 304. It is important that two operating systems do not attempt to modify the master boot record at the same time during the installation process otherwise the partition table in the master boot record will not contain the correct information for the multiple operating systems.

The operating system or a utility program acting on behalf of the operating system makes an elemental exclusive write persistent reservation on the master boot record area (step 400). If the reservation does not succeed (step 402: No), then the modification to the master boot record fails (step 404) and an error signal is sent to the operating system installation program (step 406). If the reservation on the operating system boot partition succeeds (step 402: Yes), the operating system or utility program adds the boot partition information to the master boot record (step 408). The operating system or utility program then releases the elemental exclusive write persistent reservation on the master boot record area (step 410) and the modification of the master boot record ends.

As one of ordinary skill in the art will appreciate, the process described in FIG. 4 may be performed by a utility program that is called by the operating system. By using this approach, changes to the utility program would not require changing the operating system itself.

Figure 5:
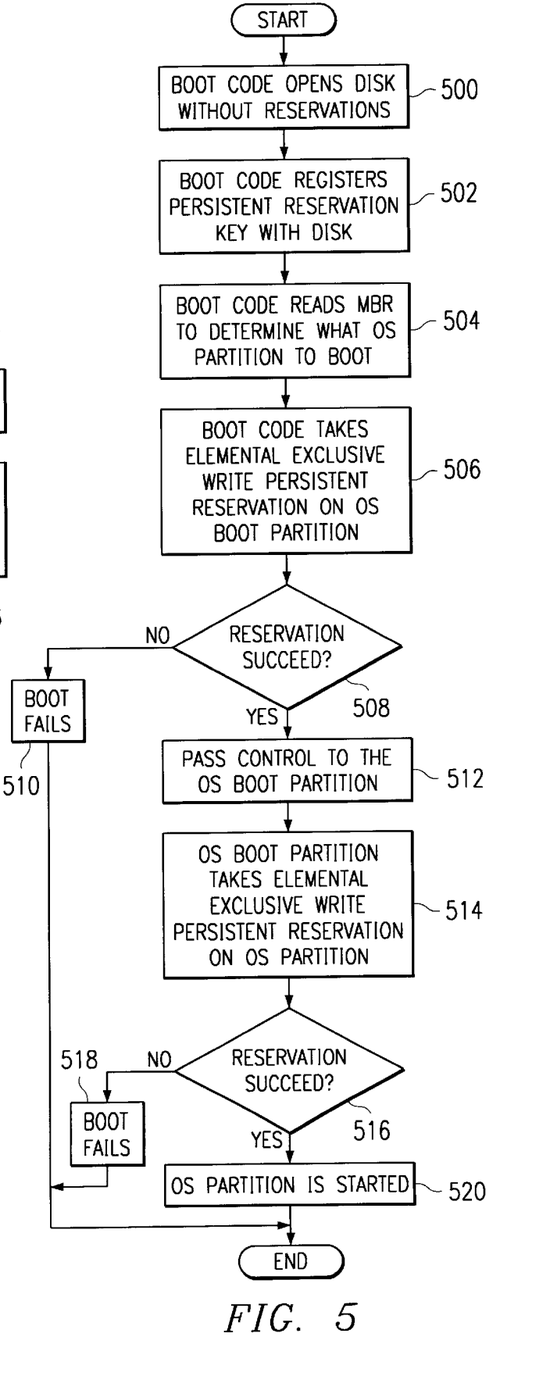
FIG. 5 is a flowchart outlining an exemplary operation of a boot process in accordance with one embodiment of the present invention.

With reference now to FIG. 5, a flowchart outlines an exemplary operation of the boot process in accordance with one embodiment of the present invention. It is assumed at this point that two or more operating systems have been installed successfully on the same system resource. The machines in FIG. 3 are shown at various stages of booting an operating system. Computer 302 is reading master boot record 304, computer 306 is reading OS/2 boot partition 308, and computers 310, 314, 318, 322, and 326 have completed the boot process.

Initially, the boot code reads the system resource without reservation (step 500). Then, the boot code registers a persistent reservation key with the system resource (step 502). The boot code reads the master boot record (MBR) and determines the partition for the operating system to be booted based on the active operating system partition information stored in NVRAM (step 504). The boot code then makes an elemental exclusive write persistent reservation on the operating system boot partition (step 506). If the reservation did not succeed (step 508: No), then the boot fails (step 510).

If the reservation on the operating system boot partition succeeds (step 508: Yes), then the code in the operating system boot partition is executed (step 512). The operating system boot partition makes an elemental exclusive write persistent reservation on the operating system partition (step 514). If the reservation did not succeed (step 516: No), then the boot fails (step 518). If the reservation on the operating system boot partition succeeds (step 516: Yes), then the code in the operating system partition is executed (step 520).

In order to keep multiple operating systems from interfering with each other, each operating system has a unique reservation key. In addition, the integrity of the operating system boot process is preserved by having the operating system boot code place an elemental persistent reservation on the operating system partition in an environment where there may be boot processes on other machines booting the same operating system from the same disk drive. It is important to note that the file system organization for the various operating system partitions need not be compatible. All that is required is that each of the boot programs can read and interpret the information in the master boot record correctly.

In summary, in the prior art, two or more operating systems could be booted from the same disk but not run simultaneously, even when these operating systems are running on different machines. By using persistent elemental disk reservations in the manner described above as presented in this invention, it is possible to have multiple operating systems running on different machines from the same system resource at the same time.

Although the above description of the invention assumed a plurality of computers sharing a system disk drive, the invention is not limited to such as embodiment. In particular, the method developed in this invention could be extended to a machine with multiple processors where each processor has its own memory partition and operating under its own operating system. In this case, multiple operating systems could be run simultaneously on the "same machine" provided each operating system is assigned its own processor and its own memory partition. As those skilled in the art will appreciate, a similar setup would be possible for NUMA (Non-Uniform Memory Access) complexes.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, as Storage Area Networks (SAN) become more prevalent there will be more sharing as outlined in this invention. The embodiment was chosen and described in order to best explain the principles of the invention the practical application and to enable others of ordinary skill in the art to understand the invention for various embodiments with various modifications as are suited to the particular use contemplated.

What is claimed is:

1. A method for booting a plurality of operating systems on a plurality of processors from a shared system resource, the method comprising:

reading a master boot record from the shared system resource by a processor from the plurality of processors to determine the partition of an operating system from the plurality of operating systems to be used;

reserving a portion of the shared system resource using a unique reservation key by the processor for accessing an operating system boot partition; and reserving a portion of the shared system resource using the unique reservation key by the processor for accessing an operating system partition.

2. The method of claim 1, wherein the reservation of a portion of a shared disk is accomplished by an elemental exclusive write persistent reservation on a contiguous sequence of sectors on the shared system resource.

3. The method of claim 1, wherein the master boot record is initially read by the processor from the shared system resource without reservation.

4. The method of claim 1, wherein the unique reservation key for reserving a portion of the shared system resource for the operating system boot partition and the operating system partition is created from at least one of the following: a Processor ID, a Cluster ID, a Multiple Processor partition ID, a Non-Uniform Memory Access complex ID, and a Non-Uniform Memory Access node ID.

5. The method of claim 1, wherein the system resource is one of the following: a system hard disk drive, a ZIP disk drive, a JAZ disk drive, a re-writable CD disk, a flexible disk drive, a tape drive, or a similar device.

6. A method in a distributed data processing system for executing a plurality of operating systems on a plurality of processors in the distributed data processing system from a shared system resource, the method comprising the processor implemented steps of:

reading a master boot record from the shared disk by each of the plurality of processors to identify operating systems for the plurality of processors;

reserving, by each of the plurality of processors, a portion of the shared system resource using a reservation key unique to each of the plurality of processors, wherein the portion is used to access an operating system boot partition; and reserving, by each of the plurality of processors, a portion of the shared system resource using the reservation key to access an operating system partition, wherein the plurality of processors concurrently execute the plurality of operating systems from the shared system resource.

7. A method in a data processing system for installing a plurality of operating systems from a plurality of processors on a shared system resource, the method comprising the data processing system implemented steps of:

a processor from the plurality of processors installing an operating system from the plurality of operating systems reserving exclusive access to a master boot record on the shared system resource;

the processor adding the operating system boot information to a partition table in the master boot record; and the processor releasing the exclusive access to the master boot record.

8. The method of claim 7, wherein the reservation of exclusive access to the master boot record of the shared system resource is accomplished by an elemental exclusive write persistent reservation on the portion of the shared system resource that contains the master boot record.

9. The method of claim 7, wherein an error message is sent to an operating system install program if the elemental exclusive write persistent reservation on the master boot record fails.

10. A distributed data processing system for booting a plurality of operating systems on a plurality of processors from a shared system resource, the data processing system comprising:

determining means for a processor from the plurality of processors reading a master boot record from the shared system resource to determine an operating system from the plurality of operating systems to be booted;

reserving means for the processor reserving a portion of the shared system resource for access to an operating system boot partition using a unique reservation key; and reserving means for the processor reserving a portion of the shared system resource for access to an operating system partition using the unique reservation key.

11. The system of claim 10, wherein the reservation of a portion of a shared disk is accomplished by an elemental exclusive write persistent reservation on a contiguous block of sectors on the shared disk.

12. The system of claim 10, wherein the master boot record is initially read by the processor from the shared system resource without reservation.

13. The system of claim 10, wherein the unique reservation key for reserving a portion of the shared system resource for the operating system boot partition and the operating system partition on the shared system resource is created from at least one of the following: a Processor ID, a Cluster ID, Multiple Processor partition ID, a Non-Uniform Memory Access complex ID, and a Non-Uniform Memory Access node ID.

14. A distributed data processing system for executing a plurality of operating systems on a plurality of processors in the distributed data processing system from a shared system resource, the distributed data processing system comprising:

reading means for reading a master boot record from the shared disk by each of the plurality of processors to identify operating systems for the plurality of processors;

reserving means for reserving, by each of the plurality of processors, a portion of the shared system resource using a reservation key unique to each of the plurality of processors, wherein the portion is used to access an operating system boot partition; and reserving means for reserving, by each of the plurality of processors, a portion of the shared system resource using the reservation key to access an operating system partition, wherein the plurality of processors concurrently execute the plurality of operating system from the shared system resource.

15. A computer program product on a computer-readable medium for use in a network workstation for booting a plurality of operating systems on a plurality of processors from a shared system resource, the computer program product comprising the data processing system implemented steps of:

instructions for a processor from the plurality of processors reading a master boot record from the shared system resource to determine an operating system from the plurality of operating systems to be booted;

instructions for the processor reserving a portion of the shared system resource for access to an operating system boot partition using a unique reservation key; and instructions for the processor reserving a portion of the shared system resource for access to an operating system partition using the unique reservation key.

16. The method of claim 15, wherein the unique reservation key is created from at least one of the following: a Processor ID, a Cluster ID, Multiple Processor partition ID, a Non-Uniform Memory Access complex ID, and a Non-Uniform Memory Access node ID.

* * * * *

UNITED STATES PATENT AND TRADEMARK OFFICE
CERTIFICATE OF CORRECTION

PATENT NO. : 6,532,538 B1
DATED : March 11, 2003
INVENTOR(S) : Cronk et al.

It is certified that error appears in the above-identified patent and that said Letters Patent is hereby corrected as shown below:

<u>Title page,</u>
Item [57], ABSTRACT,
Line 15, after "least", delete "on" and insert -- one --.

Signed and Sealed this

Seventh Day of October, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,532,538 B1
DATED         : March 11, 2003
INVENTOR(S)   : Cronk et al.

It is certified that error appears in the above-identified patent and that said Letters Patent is hereby corrected as shown below:

<u>Title page,</u>
Please insert the following:

-- [74] *Attorney, Agent, or Firm* –Duke W. Yee; Volel Emile --.

Signed and Sealed this

Ninth Day of December, 2003

JAMES E. ROGAN
*Director of the United States Patent and Trademark Office*